Patented June 19, 1923.

1,459,167

UNITED STATES PATENT OFFICE.

REINOLD V. SMITH, OF SALT LAKE CITY, UTAH, ASSIGNOR TO EUREKA METALLURGICAL COMPANY, OF SALT LAKE CITY, UTAH, A CORPORATION OF UTAH.

PROCESS OF CONCENTRATING ORES.

No Drawing.    Application filed March 4, 1922.   Serial No. 541,205.

*To all whom it may concern:*

Be it known that I, REINOLD V. SMITH, a citizen of the United States, residing at Salt Lake City, in the county of Salt Lake and State of Utah, have invented certain new and useful Improvements in Processes of Concentrating Ores, of which the following is a specification.

The present application, which is a continuation in part of my former application Serial No. 364,804, filed March 10th, 1920, relates to a process for concentrating oxidized ores by flotation. I have discovered that oxidized ores may be concentrated by flotation. One method of procedure is substantially as follows:

1. Treating the ore particles with a soluble sulfide in the presence of a suitable preparation oil or other substance and in a thick pulp.

2. Removing the water of preparation, together with so much of the preparation substance as remains with it.

3. Including the treated ore in a thin pulp, that is, one in which, instead of the comparatively small quantity of water of preparation, there is present a comparatively large quantity of water that is not effectively contaminated by the preparation substances.

4. Producing a froth of concentrates, which may be removed in any usual or preferred way.

I will first describe generally the process above outlined, and thereafter give an example of the manner of using it in the treatment of a particular ore.

The ore to be treated is prepared as usual, that is to say, it is broken up and crushed to the desired condition of fineness, and if desired the disintegrated material may be separated into granular and slimes portions, these being subjected to substantially the same treatment, thereafter, but separately.

As already indicated, one of the important features of the process is in the fact that the finely divided ore, in a thick water pulp, is treated with an oil or other substance, such as petroleum sludge, for instance, in the presence of a soluble sulfide, with the object of preparing the pulp so that the particles that it is desired to concentrate may be floated in the subsequent steps of the process. Where oil is used it may be added to the thick pulp in a suitable apparatus.

After the pulp has been treated as described in the preceding paragraph, the water, including such preparation substances as remain with it, is separated, the thoroughly mixed dewatered pulp is diluted with several times its volume of new water which is not effectively contaminated by the preparation substances, and is then discharged into a flotation cell, wherein concentration is accomplished in the usual way.

It will be understood that the process divides itself naturally into two parts, i. e., preparation of the finely divided ore in a thick pulp, and flotation of mineral-particle components thereof in a dilute pulp. Further, instead of removing the water of preparation I may form the thin flotation pulp by dilution with quantities of new water, sufficient to substantially eliminate the deterrent effect of remanent sulfidizing agents.

The granular portions of the ore, and the slimes, may be treated separately by the steps above described, and the preparation water from the sands pulp be re-used in the preparation of a fresh supply of slimes, while that from the slimes pulp is re-used in the preparation of fresh supplies of sands.

In some instances where there is present in the ore a large amount of "slimes" I have found it expedient after separating the sands and slimes portions, to float the sands portion and pass the sand tailings from the sands flotation machine to a storage tank where the slime portion is mixed with these sand tailings or a portion of them, and this mixture agitated in the slimes flotation machines.

The following are examples of the application of my process in the flotation of particular ores:

*Example No. 1.*

Five hundred grams of oxidized silver-lead ore,—the value bearing minerals were cerrusite and anglisite,—were mixed with 500 c. c. of water, 5 grms. of sodium sulfide, 2 grms. of P. & E. oil (a petroleum oil) and 1/8 grm. of reconstructed Yaryan pine oil, and all ground in a ball mill to approximately 80% through a 200 mesh screen.

The water of preparation was removed by decantation, and the decanted pulp was placed in a Janney laboratory flotation machine, 1200 c. c. of fresh water was added and the now dilute pulp agitated and the lead silver concentrate removed. The ore contained 0.01 oz. gold; 6.28 ozs. silver and 16.29% lead. The concentrates assayed 0.05 ozs. gold; 22.75 ozs. silver; 66.5% lead. The tailings assayed—trace gold; 1.5 ozs. silver; 1.57% lead, showing a recovery of 81.5% of the silver and 92% of the lead.

*Example No. 2.*

Another oxidized lead-silver ore was treated as follows:—

About 2000 lbs. of ore were ground with water in a Chilean ball mill until 90% of the ore passed a 100 mesh screen. The ground ore was separated into sand and slime portions. Both of these portions were allowed to settle and the excess water decanted.

*Sand portion.*

The equivalent of 400 lbs. of dry sands, in thick pulp condition were charged to a flotation machine and 2.5 lbs. of sodium sulfide, 4 lbs. of winter black oil, 1/20 lb. of coal tar creosote and 1/40 lb. of reconstructed Yaryan pine oil added and the thick pulp agitated for a few minutes. Then 1200 lbs. of fresh water were run into the machine and the dilute pulp was then agitated for fifteen minutes, and the concentrates removed.

The results were as follows:—

The sand heads assayed—0.002 oz. gold; 4.35 ozs. silver; 7.2% lead. The concentrates assayed 0.025 oz. gold; 26.5 ozs. silver and 51.0% lead. The tailings assayed—trace gold; 1.66 ozs. silver and 1.4% lead, showing a recovery of 66% silver and 82% lead.

*Slime portion.*

The equivalent of 200 lbs. of dry slimes in thick pulp condition were charged to a flotation machine and 2 lbs. of sodium sulfide, 2 lbs. of gilsonite mixture, 1/40 lb. of reconstructed Yaryan pine oil and 1/20 lb. of coal tar creosote added and the thick pulp agitated for a few minutes. Then 600 lbs. of fresh water were run into the flotation machine and the dilute pulp was agitated for 15 minutes and the concentrates removed.

The results were as follows:—

The slime heads contained—0.005 oz. gold; 5.94 ozs. silver and 11.8% lead. The concentrates assayed 17.94 ozs. silver and 39.5% lead. The tailings assayed 1.58 ozs. silver and 1.9% lead, showing a recovery of 81% of the silver and 88% of the lead.

It will be understood that I do not limit myself to any particular sequence of operations stated in the claims, except where the steps must necessarily come in the stated sequence.

I claim:

1. The process which comprises oiling and sulfidizing oxidized ore in an aqueous pulp, substantially removing the water of the pulp after such oiling and sulfidizing, diluting said pulp with uncontaminated water, and subjecting the same to flotation.

2. The process which comprises oiling and sulfidizing oxidized ore in a thick aqueous pulp, substantially removing the water of the pulp after such oiling and sulfidizing, diluting said pulp with uncontaminated water, and subjecting the same to flotation.

3. The process which comprises oiling and sulfidizing oxidized ore in an aqueous pulp, substantially removing the water of the pulp after such oiling and sulfidizing, diluting said pulp with uncontaminated water, and subjecting the same to froth flotation.

4. The process which comprises oiling and sulfidizing oxidized ores in an aqueous pulp, diluting the pulp with sufficient uncontaminated water to substantially eliminate the deterrent effect of remanent sulfidizing agents, and subjecting the so-prepared pulp to froth flotation.

5. The process which comprises oiling and sulfidizing oxidized ores in a thick aqueous pulp, diluting the pulp with sufficient uncontaminated water to substantially eliminate the deterrent effect of the remanent sulfidizing agents, and subjecting the so-prepared pulp to froth flotation.

6. As part of a process of concentrating finely divided ores, the steps of separating them into slimes and sands portions, preparing for flotation and concentrating by flotation the sands portion, recovering sand tailings, mixing sand tailings with the slimes portion, agitating the mixture and concentrating it by flotation.

7. As part of a process of concentrating finely divided oxidized ore, the steps of separating the ore into slimes and sands portions, producing a thick pulp with each of said portions, treating each pulp with preparation substances, removing from each pulp the water of preparation together with so much of the preparation substance as remains with it, and using the preparation water removed from the slimes pulp, in preparing a fresh sands portion, and using the preparation water removed from the sands pulp in preparing a fresh slimes portion.

In testimony whereof I affix my signature in presence of two witnesses.

REINOLD V. SMITH.

Witnesses:
WARREN STRATTON,
L. R. MARTINEAU, Jr.